(12) United States Patent
Motohashi et al.

(10) Patent No.: US 10,762,656 B2
(45) Date of Patent: Sep. 1, 2020

(54) INFORMATION PROCESSING DEVICE, IMAGING DEVICE, APPARATUS CONTROL SYSTEM, INFORMATION PROCESSING METHOD, AND COMPUTER PROGRAM PRODUCT

(71) Applicants: Naoki Motohashi, Kanagawa (JP); Sadao Takahashi, Kanagawa (JP)

(72) Inventors: Naoki Motohashi, Kanagawa (JP); Sadao Takahashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/347,959

(22) PCT Filed: Sep. 13, 2017

(86) PCT No.: PCT/JP2017/033052
§ 371 (c)(1),
(2) Date: May 7, 2019

(87) PCT Pub. No.: WO2018/100839
PCT Pub. Date: Jun. 7, 2018

(65) Prior Publication Data
US 2019/0279386 A1    Sep. 12, 2019

(30) Foreign Application Priority Data

Nov. 30, 2016   (JP) ................. 2016-233088

(51) Int. Cl.
*G06K 9/00* (2006.01)
*G06T 7/593* (2017.01)
(Continued)

(52) U.S. Cl.
CPC .......... *G06T 7/593* (2017.01); *G06K 9/00791* (2013.01); *G06K 9/00805* (2013.01);
(Continued)

(58) Field of Classification Search
CPC .............. H04N 2013/0081; G06T 2207/30252
See application file for complete search history.

(56) References Cited

U.S. PATENT DOCUMENTS 5,530,420 A * 6/1996 Tsuchiya ................. G01S 11/12
340/435
5,983,157 A * 11/1999 Sugitani ................ G01P 13/045
180/169

(Continued)

FOREIGN PATENT DOCUMENTS

| JP | 2001-91217 A | 4/2001 |
| JP | 2008-309519 A | 12/2008 |

(Continued)

OTHER PUBLICATIONS

International Search Report and Written Opinion dated Dec. 11, 2017 in PCT/JP2017/033052 filed on Sep. 13, 2017.

(Continued)

*Primary Examiner* — Paulos M Natnael
(74) *Attorney, Agent, or Firm* — Oblon, McClelland, Maier & Neustadt, L.L.P.

(57) ABSTRACT

An information processing device includes a disparity information input unit configured to acquire disparity image data indicating a disparity image including a disparity; a V map generating unit configured to generate a V map indicating a frequency of the disparity for each of coordinates of the disparity image by voting the disparity at a position corresponding to the coordinate of each of pixels of the disparity image based on the disparity image data; a shape estimating unit configured to estimate a road surface shape based on the V map; a height table generating unit configured to generate a height table indicating a relationship between the disparity and a height of a road surface based on the estimated road surface shape; and a correcting unit configured to correct, based on rolling information on rolling of a stereo camera (Continued)

that acquires the disparity, information used to generate information indicating the road surface shape so as to cancel out an influence of the rolling.

10 Claims, 11 Drawing Sheets

(51) Int. Cl.

| | | |
|---|---|---|
| H04N 13/204 | (2018.01) | |
| G06T 3/20 | (2006.01) | |
| G06T 3/60 | (2006.01) | |
| G06T 7/70 | (2017.01) | |
| H04N 13/00 | (2018.01) | |

(52) U.S. Cl.
CPC ............. *G06T 3/20* (2013.01); *G06T 3/60* (2013.01); *G06T 7/70* (2017.01); *H04N 13/204* (2018.05); *G06T 2207/10021* (2013.01); *G06T 2207/30256* (2013.01); *G06T 2207/30261* (2013.01); *H04N 2013/0081* (2013.01)

(56) References Cited

U.S. PATENT DOCUMENTS

| | | | |
|---|---|---|---|
| 6,169,572 B1 * | 1/2001 | Sogawa | G01S 11/12 |
| | | | 348/113 |
| 6,661,449 B1 * | 12/2003 | Sogawa | G05D 1/0251 |
| | | | 348/113 |
| 6,963,657 B1 | 11/2005 | Nishigaki et al. | |
| 9,330,320 B2 * | 5/2016 | Takahashi | G06K 9/00791 |
| 9,886,649 B2 * | 2/2018 | Kakegawa | G08G 1/165 |
| 2001/0031068 A1 * | 10/2001 | Ohta | G01O 3/08 |
| | | | 382/103 |
| 2012/0069181 A1 | 3/2012 | Xue et al. | |
| 2012/0147187 A1 | 6/2012 | Li et al. | |
| 2012/0242835 A1 | 9/2012 | Li et al. | |
| 2012/0268602 A1 | 10/2012 | Hirai et al. | |
| 2013/0050570 A1 | 2/2013 | Ishigaki et al. | |
| 2013/0136306 A1 | 5/2013 | Engel | |
| 2013/0188051 A1 | 7/2013 | Ishigaki et al. | |
| 2015/0049195 A1 | 2/2015 | Ishigaki et al. | |
| 2015/0294160 A1 | 10/2015 | Takahashi et al. | |
| 2015/0332435 A1 | 11/2015 | Motohashi et al. | |
| 2016/0014406 A1 * | 1/2016 | Takahashi | G06T 7/73 |
| | | | 348/148 |
| 2016/0019429 A1 * | 1/2016 | Ishigaki | G06F 16/583 |
| | | | 348/47 |
| 2016/0131579 A1 * | 5/2016 | Sekiguchi | G01N 21/55 |
| | | | 701/36 |
| 2016/0261848 A1 * | 9/2016 | Sekiguchi | B60R 1/00 |
| 2017/0220877 A1 * | 8/2017 | Kakegawa | B60R 21/00 |
| 2017/0262934 A1 | 9/2017 | Datye et al. | |
| 2018/0365846 A1 * | 12/2018 | Sumiyoshi | G06T 7/50 |
| 2019/0012798 A1 * | 1/2019 | Amano | G08G 1/16 |
| 2019/0295281 A1 * | 9/2019 | Yamada | G06K 9/00805 |

FOREIGN PATENT DOCUMENTS

| | | |
|---|---|---|
| JP | 2017-162116 A | 9/2017 |
| JP | 2018-85059 A | 5/2018 |
| WO | WO 2017/158964 A1 | 9/2017 |

OTHER PUBLICATIONS

Burlacu, A. et al., "Obstacle Detection in Stereo Sequences using Multiple Representations of the Disparity Map", 2016 20th International Conference on System Theory, Control and Computing (ICSTCC), IEEE, Oct. 13, 2016, pp. 854-859, XP033024313, DOI: 10.1109/ICSTCC.2016.7780775, [retrieved on Dec. 16, 2016], abstract, Sections I to III; IV. A.

Llorca, D.F. et al., "Stereo regions-of-interest selection for pedestrian protection: A survey", Transportation Research Part C: Emerging Technologies, vol. 25, Dec. 1, 2012, pp. 228-237, XP055142562, ISSN: 0968-090X. DOI: 10.1016/j.trc 2012.06.006, abstract p. 229, paragraph 3—p. 231, paragraph 4, figure 2.

Hu, Z. et al., "U-V-Disparity: An efficient algorithm for Stereovision Based Scene Analysis", Intelligent Vehicles Symposium, 2005, Proceedings, IEEE Las Vegas NV, USA Jun. 6-8, 2005. Piscataway, NJ, USA, Jun. 6, 2005, pp. 48-54, XP010833942, DOI: 10.1109/IVS.2005.1505076, ISBN: 978-0-7803-8961-8, abstract, Sections I to III.

Suganuma, N., "Clustering and Trailing of Obstacles Using Stereo Vision System", ICCAS-SICE, 2009, IEEE, Piscataway, NJ, USA, Aug. 18, 2009, pp. 4623-4628, XP031565771, ISBN: 978-4-907764-34-0, abstract. Sections 1, 2 and 3.1.

Wandfluh, M., "Obstacle detection using V-disparity: Integration to the CRAB rover", Jan. 1, 2009, XP055209371, Retrieved from the Internet: URL:http://students.asi.ethz.ch/upl_pdf/97-report.pdf [retrieved on Aug. 25, 2015], Sections 3.1 and 3.2 (61 pages).

* cited by examiner

[Fig. 1]
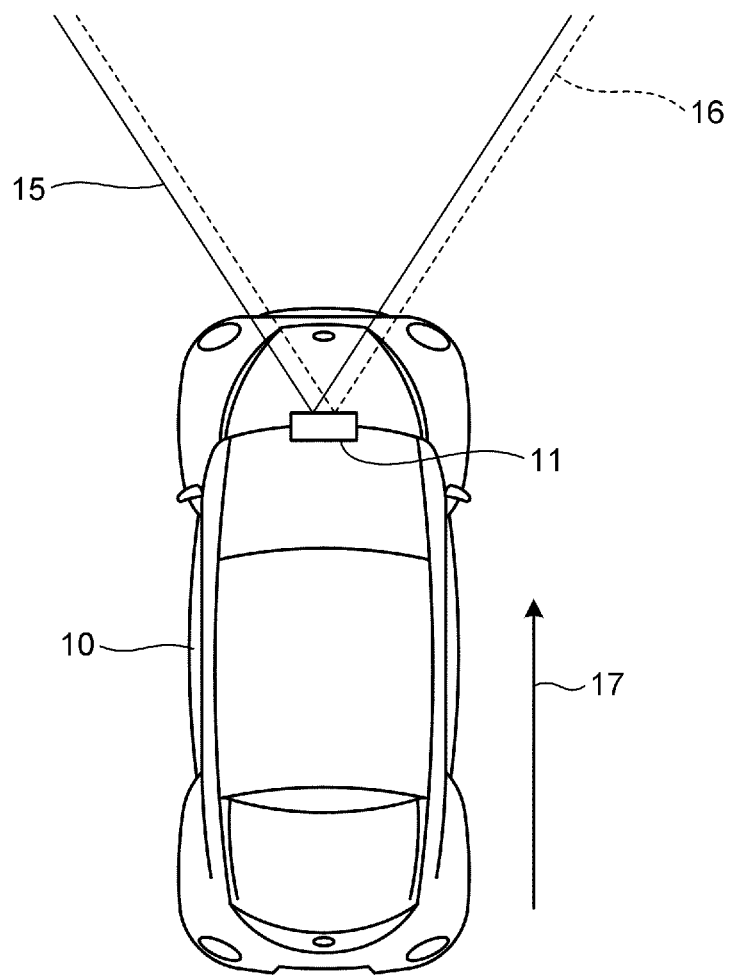
[Fig. 2]
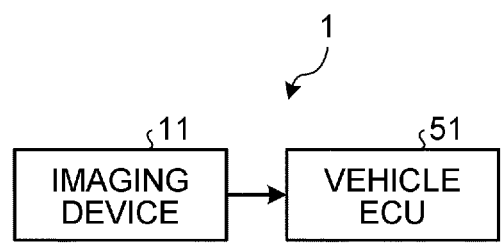

[Fig. 3]
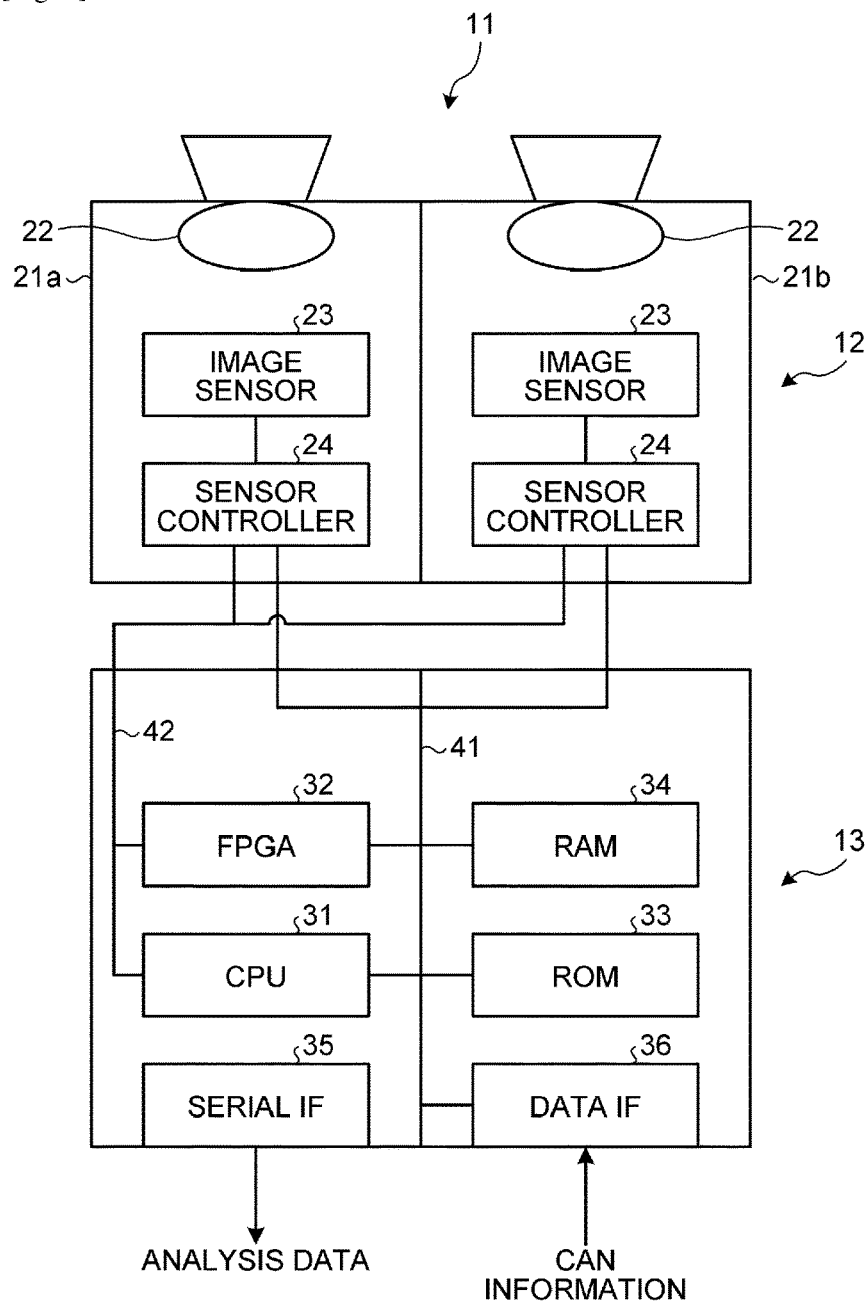
[Fig. 4]
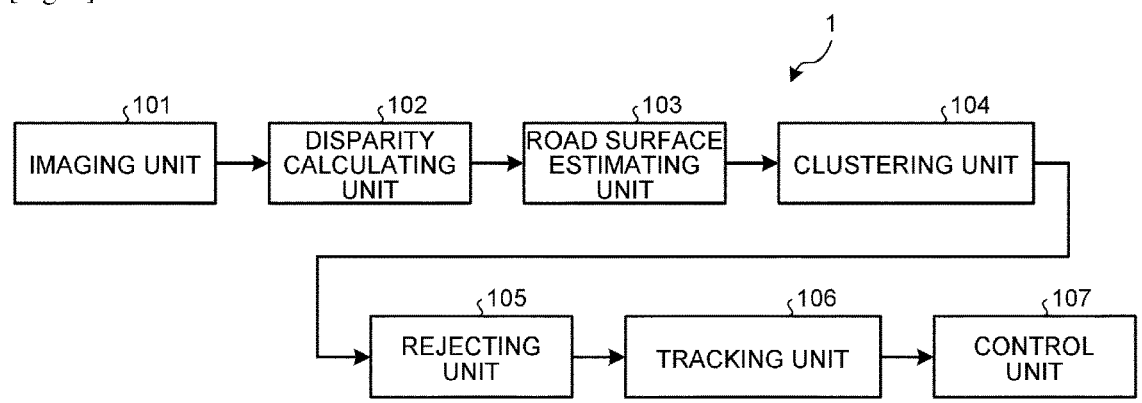

[Fig. 5]
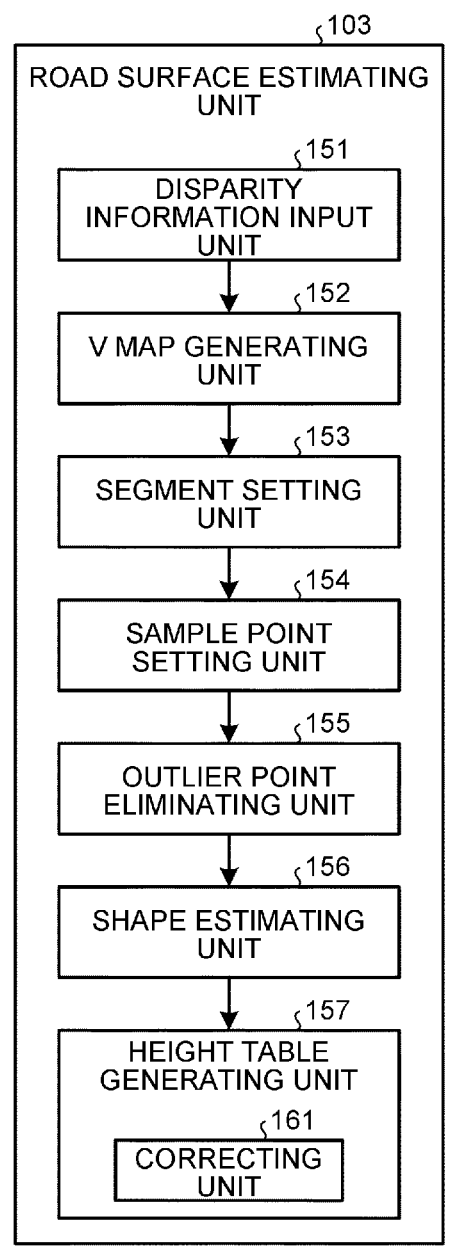

[Fig. 6]
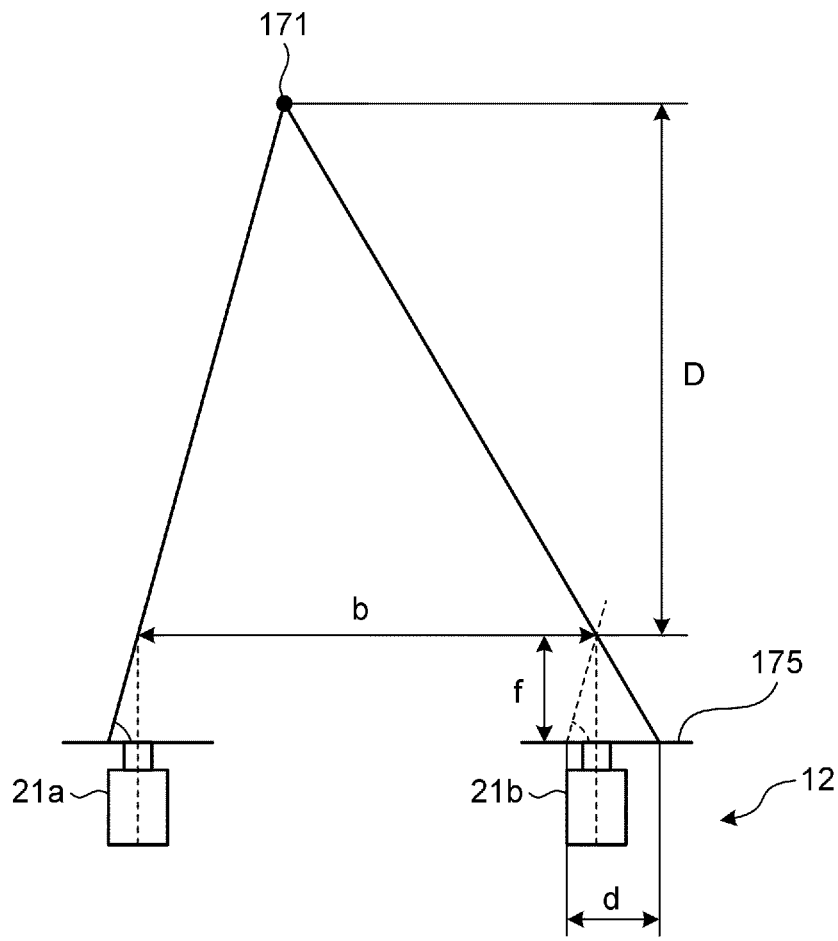
[Fig. 7]
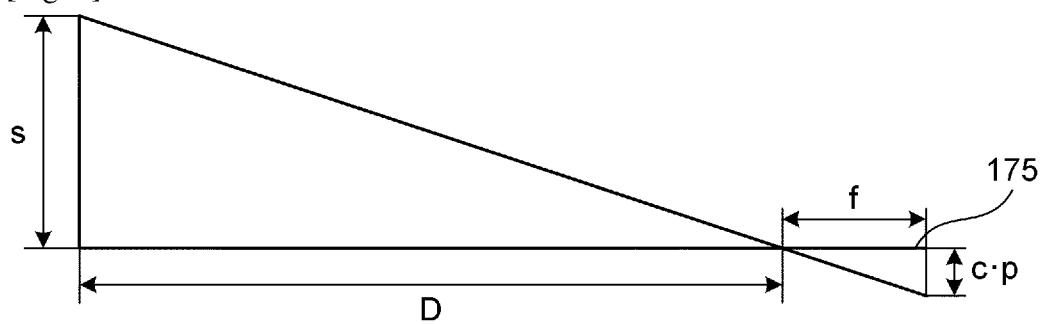

[Fig. 8]
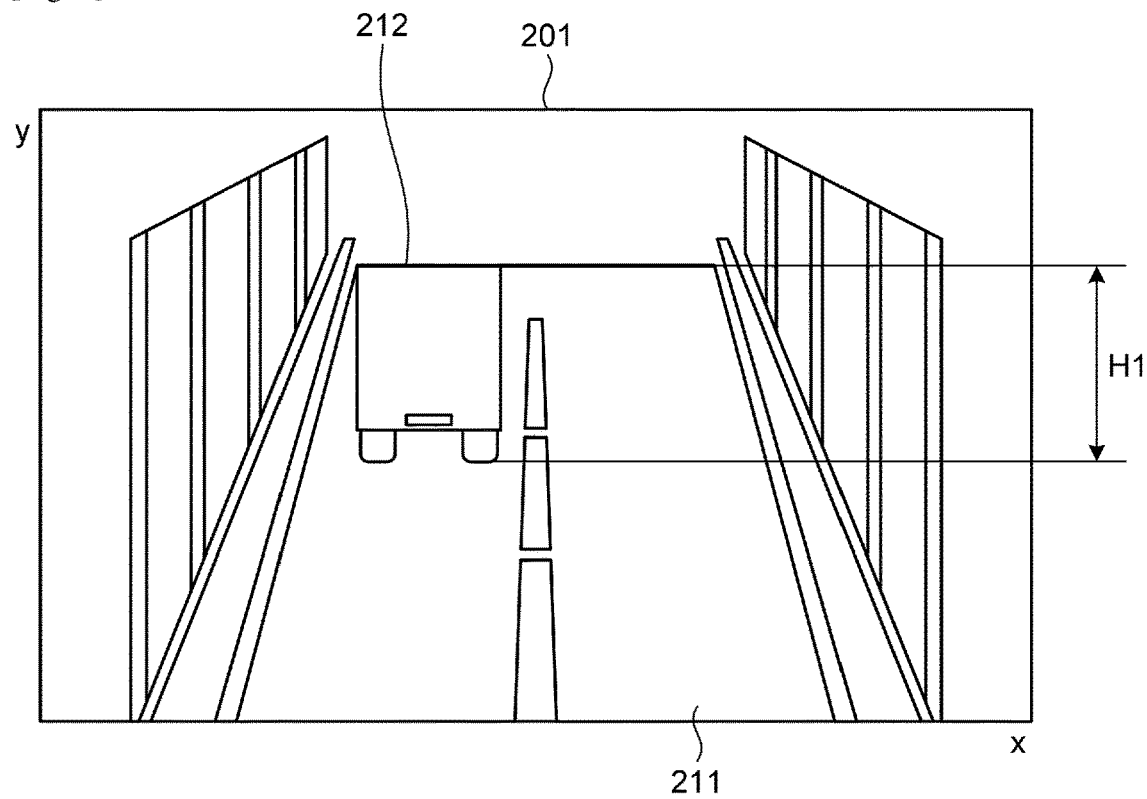
[Fig. 9]
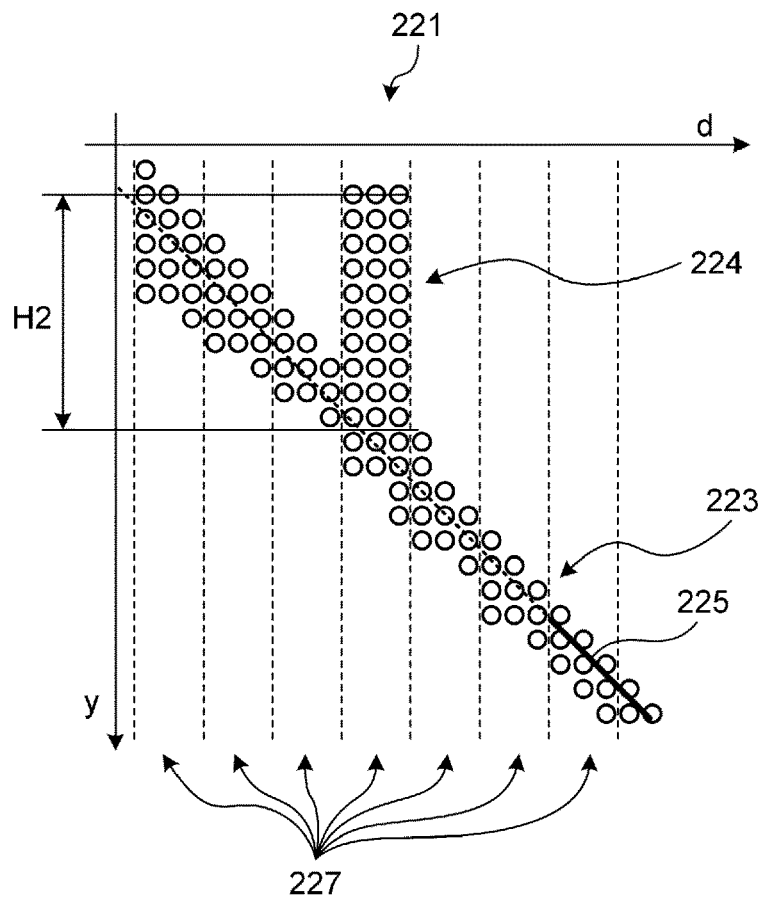

[Fig. 10]
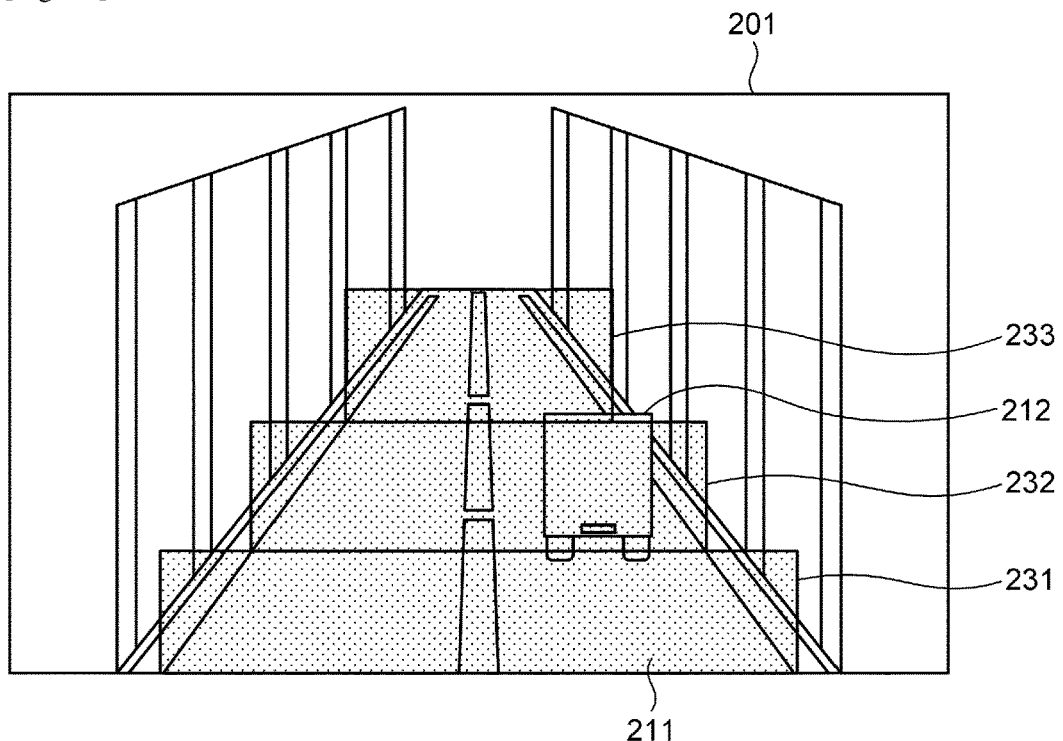
[Fig. 11]
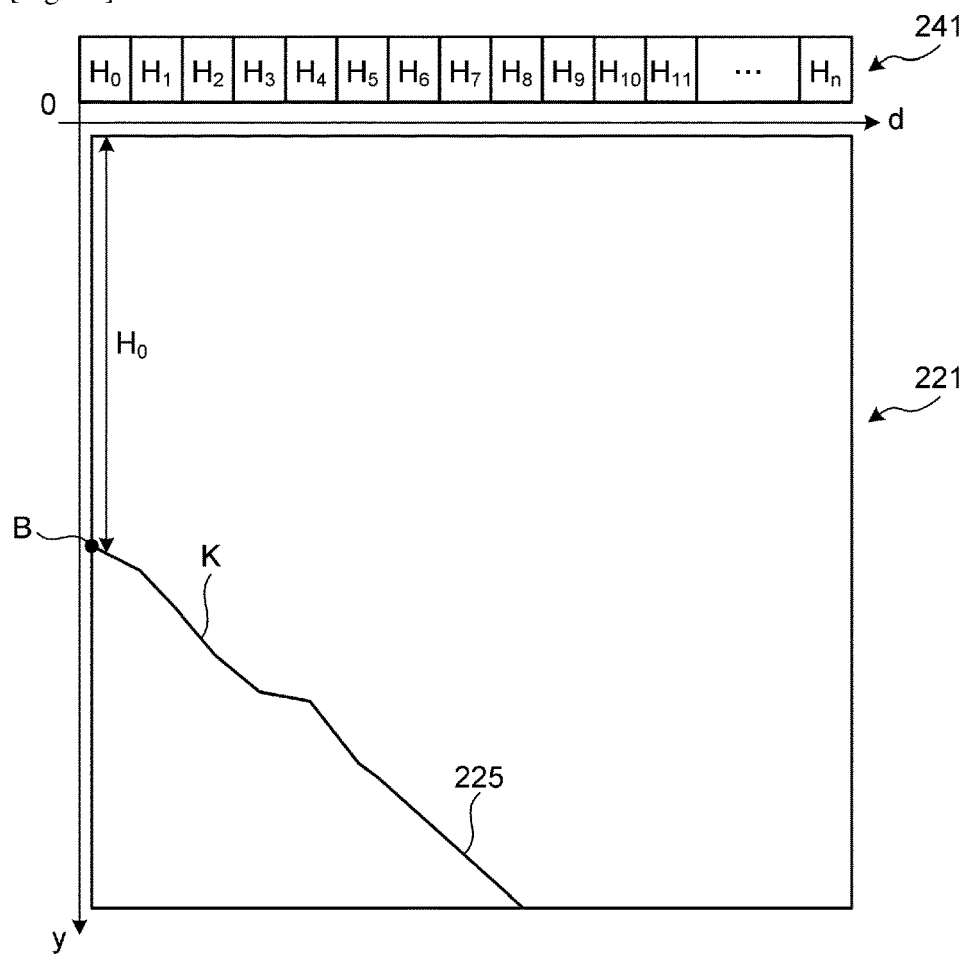

[Fig. 12]
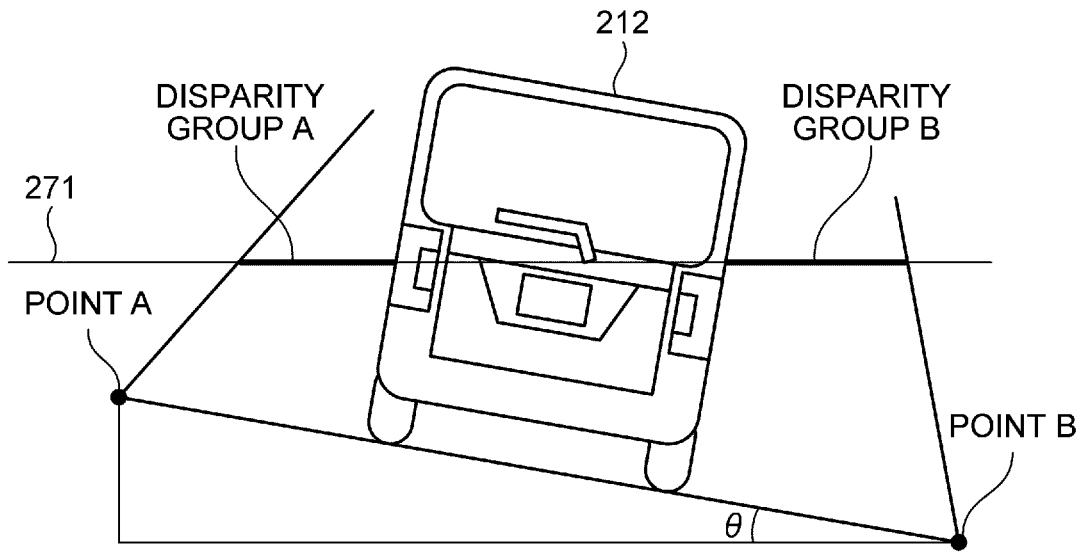
[Fig. 13]
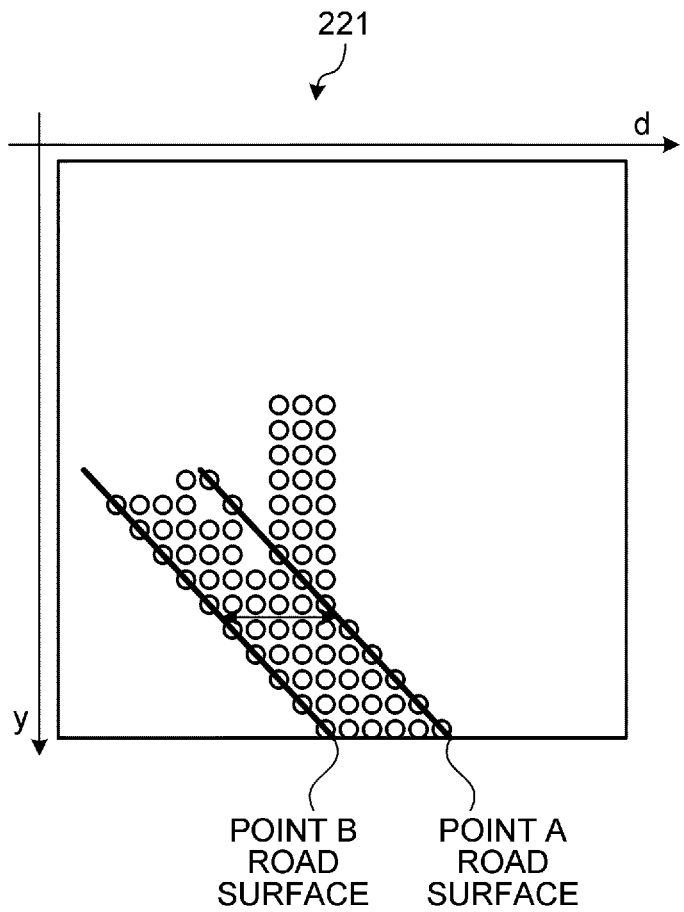

[Fig. 14]
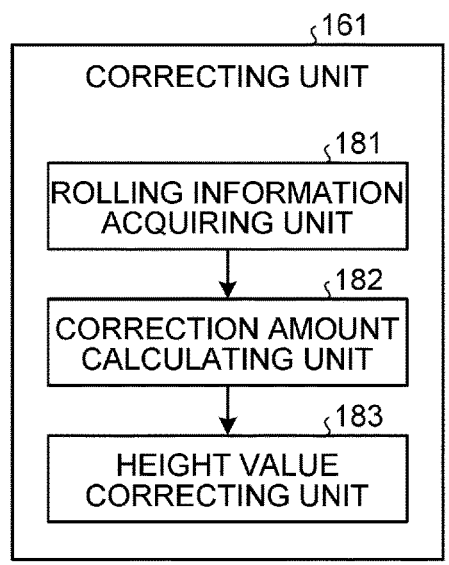
[Fig. 15]
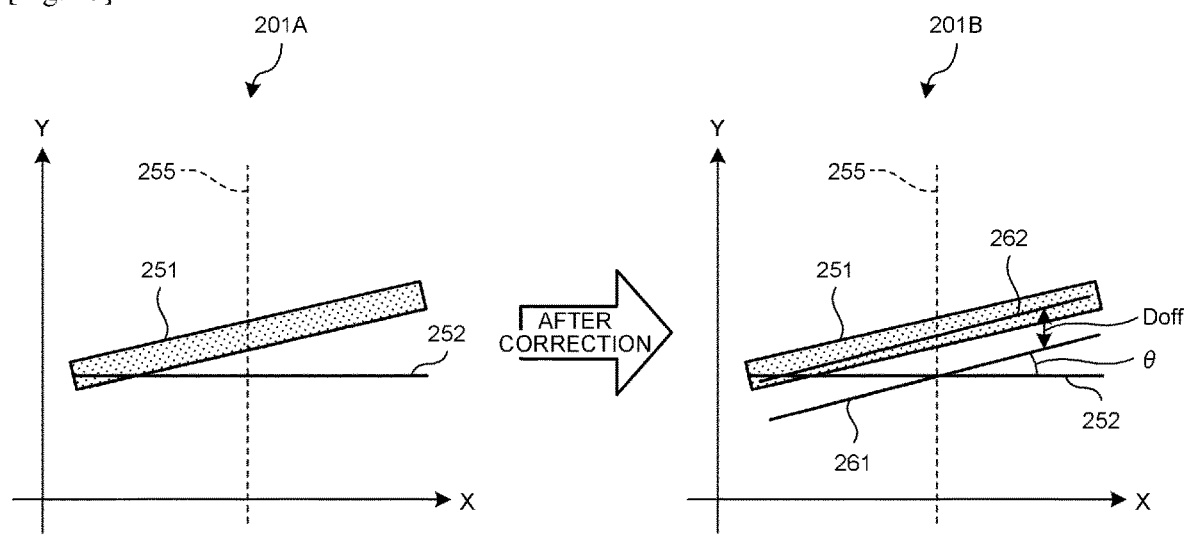

[Fig. 16]
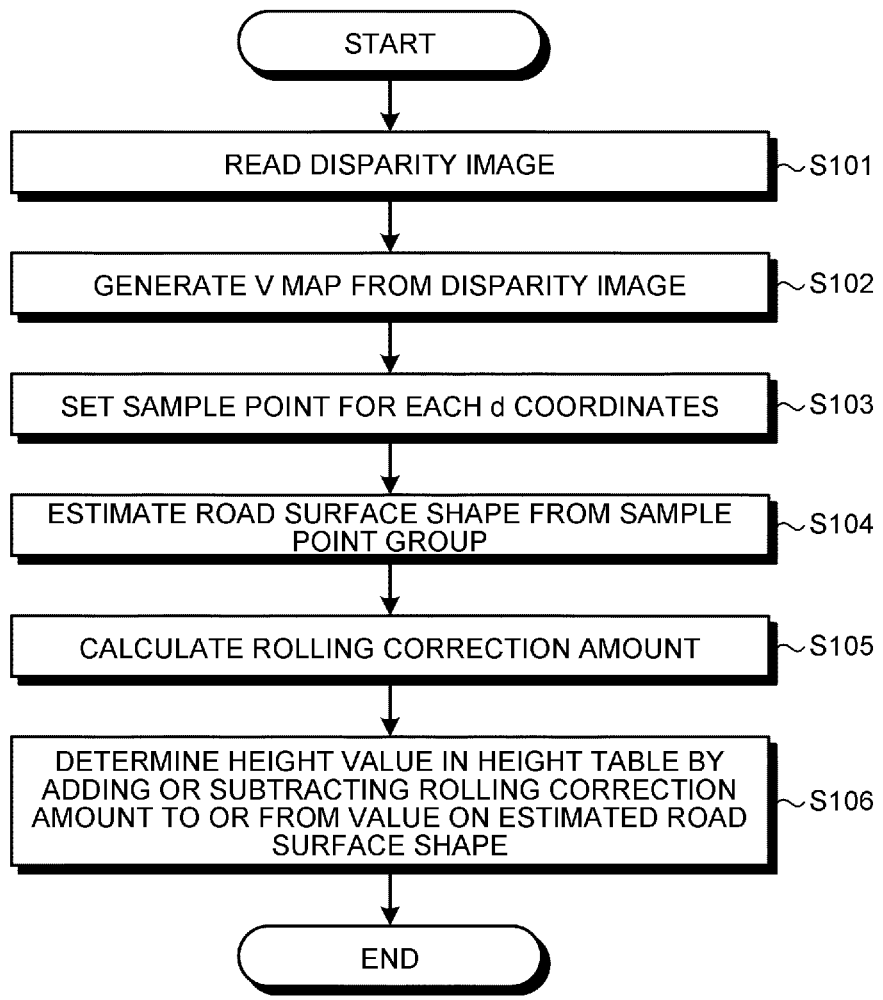

[Fig. 17]
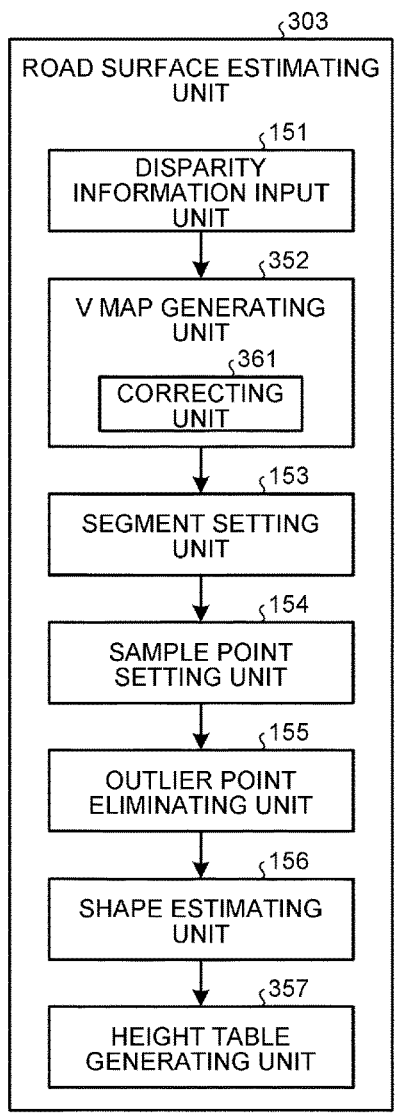
[Fig. 18]
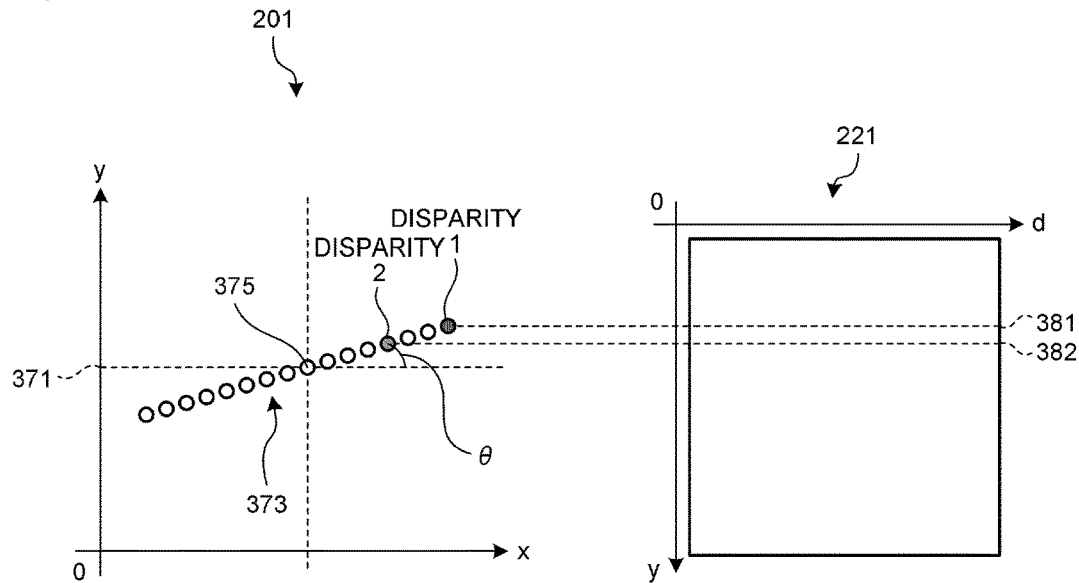

[Fig. 19]
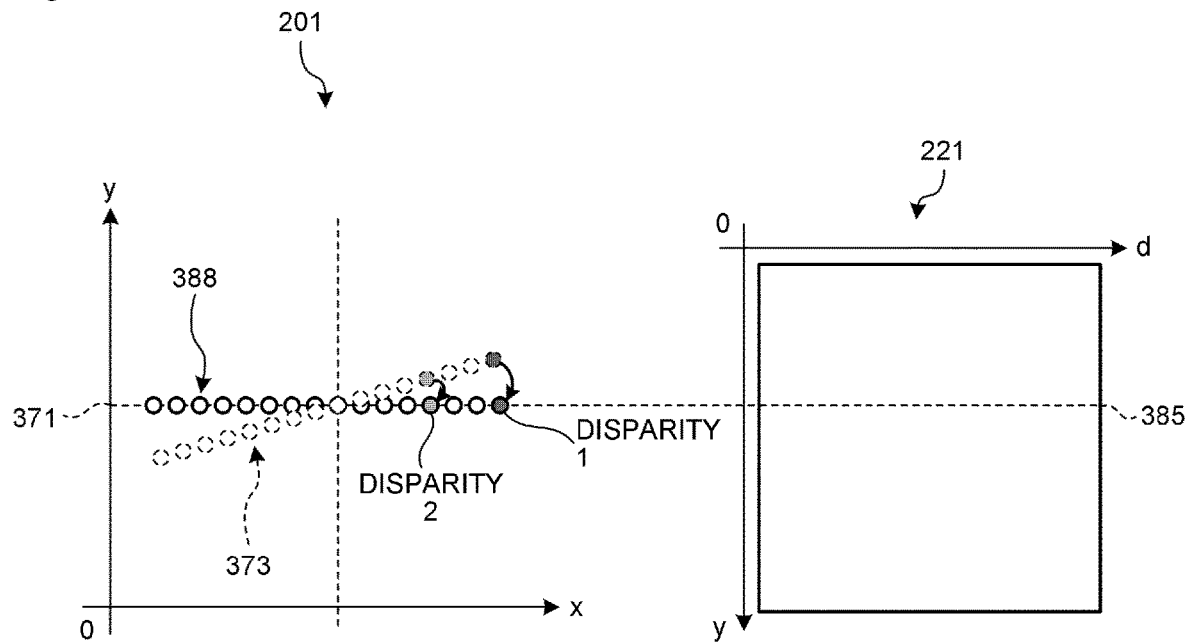
[Fig. 20]
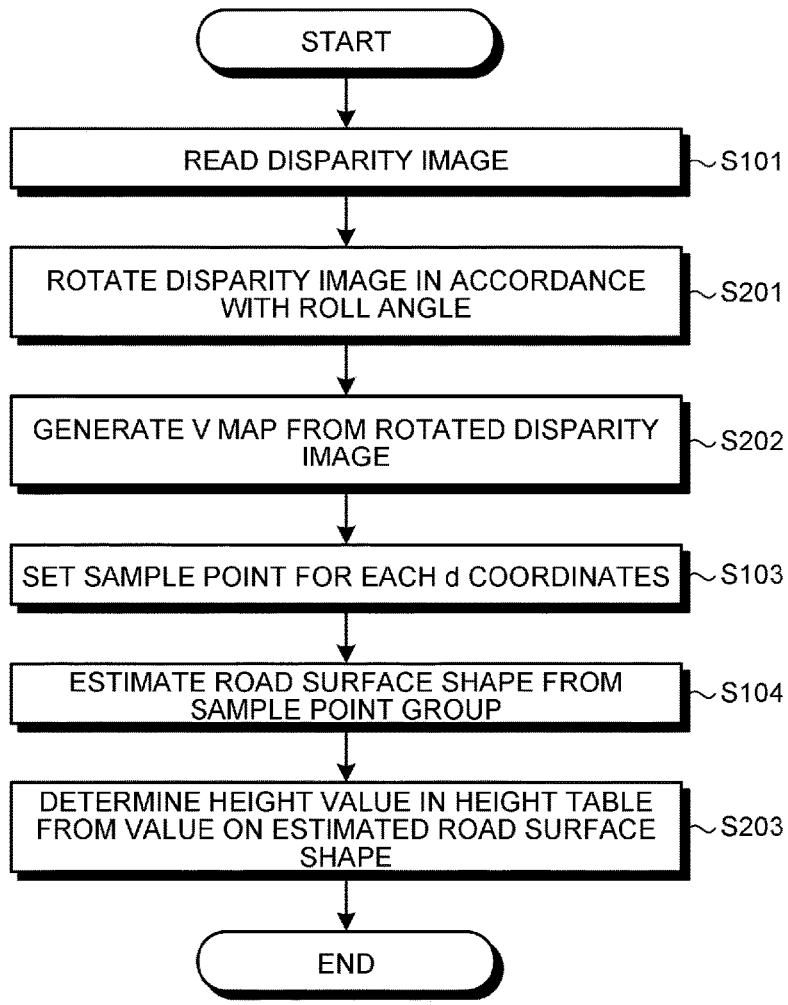

INFORMATION PROCESSING DEVICE, IMAGING DEVICE, APPARATUS CONTROL SYSTEM, INFORMATION PROCESSING METHOD, AND COMPUTER PROGRAM PRODUCT

TECHNICAL FIELD

The present invention relates to an information processing device, an imaging device, an apparatus control system, an information processing method, and a computer program product.

BACKGROUND ART

Conventionally, for the safety of automobiles, automotive body structures or the like have been developed in terms of how to save a pedestrian and protect an occupant when the pedestrian and an automobile crash into each other. However, in recent years, with the advancement of an information processing technology and an image processing technology, a technology to detect a person and an automobile at a high speed is being developed. By applying these technologies, an automobile that prevents an occurrence of a crash by automatically putting a brake before the automobile hits an object has already been developed. In automatic vehicle control, it is necessary to accurately measure a distance to an object, such as a person or some other vehicle; therefore, distance measurement using a millimeter wave radar or a laser radar, distance measurement using a stereo camera, and the like have been put to practical use. To put the above-described automatic vehicle control to practical use, it is necessary to detect objects that appear on a screen and perform control for each of the objects based on information obtained through the distance measurement using the above-described device. For example, it may be possible to change control depending on whether a detected object is a pedestrian or a vehicle.

If a distance is measured by using a stereo camera, it is possible to generate a disparity image based on an amount of deviation (disparity) between local areas captured by left and right cameras, and measure a distance between a subject vehicle and an object ahead of the subject vehicle. Then, through a clustering process of detecting a group of disparity pixels located at similar distances (with similar disparity values) as a single object, it becomes possible to detect the shape of a road surface on which the subject vehicle is running and an object (a person, a vehicle, a structural object, or the like) to be a target for crash avoidance or the like.

As an object recognition apparatus that estimates the shape of a road surface by using a disparity image, there is a disclosed structure that, to eliminate an influence of pitching, rolling, or the like of a subject vehicle, includes: a measuring means that divides an image obtained from a stereo camera into windows and measures a distance to an object for each of the windows; an estimating means that estimates an inclination of a road surface relative to the vehicle based on a distance of the road surface imaged by the stereo camera; a determining means that determines whether an imaging object is an obstacle or a character or a mark on the road surface for each of the windows based on the estimated inclination of the road surface; and a recognizing means that recognizes the object based on a determination result obtained by the determining means. In the structure, a distance from the subject vehicle to the road surface (a flat road surface) is calculated in advance and a distance is calculated for each of the windows based on the assumption that the road surface is flat (Japanese Patent Application Laid-open No. 2001-091217).

SUMMARY OF INVENTION

Technical Problem

In a system that estimates a road surface shape based on a distance image (a disparity image or the like), if rolling occurs on a unit (a stereo camera or the like) that acquires distance information (a disparity or the like), the distance information corresponding to the road surface may not accurately indicate the condition of an actual road surface in some cases. Therefore, when estimating the road surface shape based on the distance image, it is necessary to perform a correction process for eliminating the influence of rolling.

It is often the case that an actual road surface has a changing gradient; therefore, to eliminate the influence of rolling and estimate the shape of a road surface with high accuracy, it is necessary to perform a correction process that is not influenced by the gradient of the road surface. In the correction process based on the assumption that a road surface is flat as in the conventional technology as described above, it is difficult to accurately estimate a road surface shape when rolling of a camera or the like occurs on an actual road surface with a changing gradient.

The present invention has been made in view of the above, and an object is to improve the accuracy of estimation of a road surface shape.

Solution to Problem

According to an embodiment, provided is an information processing device including an acquiring unit configured to acquire distance image data indicating a distance image including distance information; a first generating unit configured to generate frequency information indicating a frequency of the distance information for each of coordinates in the distance image by voting the distance information at a position corresponding to a coordinate of each of pixels of the distance image based on the distance image data; an estimating unit configured to estimate a road surface shape based on the frequency information; a second generating unit configured to generate height information indicating a relationship between the distance information and a height of a road surface based on the estimated road surface shape; and a correcting unit configured to correct, based on rolling information on rolling of a distance information acquiring unit that acquires the distance information, information used to generate information indicating the road surface shape so as to cancel out an influence of the rolling.

Advantageous Effects of Invention

According to an aspect of the present invention, it is possible to improve the accuracy of estimation of a road surface shape.

BRIEF DESCRIPTION OF DRAWINGS

FIG. 1 is a schematic diagram illustrating an example of a vehicle equipped with an apparatus control system according to a first embodiment.

FIG. 2 is a diagram illustrating an example of an overall hardware configuration of the apparatus control system according to the first embodiment.

FIG. 3 is a diagram illustrating an example of a hardware configuration of an imaging device according to the first embodiment.

FIG. 4 is a diagram illustrating an example of a functional configuration of the apparatus control system according to the first embodiment.

FIG. 5 is a diagram illustrating an example of a functional configuration of a road surface estimating unit according to the first embodiment.

FIG. 6 is a diagram for explaining a relationship between a disparity and a distance from a stereo camera to an object.

FIG. 7 is a diagram for explaining a method for converting the size of an object to the number of pixels.

FIG. 8 is a diagram illustrating an example of a disparity image.

FIG. 9 is a diagram illustrating an example of a V map corresponding to the disparity image illustrated in FIG. 8.

FIG. 10 is a diagram illustrating an example of voting areas to be targets for voting in the disparity image.

FIG. 11 is a diagram illustrating an example of the V map and a height table.

FIG. 12 is a diagram for explaining an influence of rolling of the stereo camera on a road surface estimation process.

FIG. 13 is a diagram illustrating an example of a V map corresponding to a situation illustrated in FIG. 12.

FIG. 14 is a diagram illustrating an example of a functional configuration of a correcting unit according to the first embodiment.

FIG. 15 is a diagram illustrating an example of a disparity image when an estimated road surface is corrected by using a rolling correction amount.

FIG. 16 is a flowchart illustrating an example of the flow of a process performed by the road surface estimating unit according to the first embodiment.

FIG. 17 is a diagram illustrating an example of a functional configuration of a road surface estimating unit according to a second embodiment.

FIG. 18 is a diagram illustrating an example of a state of voting in a V map before correction.

FIG. 19 is a diagram illustrating an example of a state of voting in the V map after correction.

FIG. 20 is a flowchart illustrating an example of the flow of a process performed by the road surface estimating unit according to the second embodiment.

DESCRIPTION OF EMBODIMENTS

Embodiments of an information processing device, an imaging device, an apparatus control system, an information processing method, and a computer program product according to the present invention will be described below with reference to the drawings. The present invention is not limited by the embodiments below. Components in the embodiments described below include one that can easily be thought of by a person skilled in the art, one that is practically identical, and one that is within an equivalent range. Furthermore, within the scope not departing from the gist of the following embodiments, various omission, replacement, and modifications of the components may be made.

First Embodiment

FIG. 1 is a schematic diagram illustrating an example of a vehicle 10 equipped with an apparatus control system according to a first embodiment. The vehicle 10 according to the first embodiment includes an imaging device 11 in an upper part of a windshield (near a rearview mirror). The imaging device 11 according to the first embodiment includes a stereo camera (a distance information acquiring unit) that acquires captured image data of an area ahead of the vehicle 10 in a travelling direction 17, and an image analyzing unit (an information processing device) that analyzes the captured image data acquired by the stereo camera and generates analysis data indicating an analysis result. The stereo camera according to the first embodiment acquires luminance data of a left view 15 and luminance data of a right view 16 by two camera units that are horizontally arranged. The image analyzing unit generates analysis data including a shape of a road surface, presence or absence of an object to be a target for crash avoidance or the like, a distance between the object and the vehicle 10, or the like, based on the left luminance data and the right luminance data obtained by the stereo camera.

FIG. 2 is a diagram illustrating an example of an overall hardware configuration of an apparatus control system 1 according to the first embodiment. The apparatus control system 1 includes the imaging device 11 and a vehicle engine control unit (ECU) 51 (an apparatus control unit). The analysis data generated by the image analyzing unit of the imaging device 11 is input to the vehicle ECU 51. The vehicle ECU 51 is a unit including a circuit that generates a signal for controlling a running condition of the vehicle 10, and is constructed by using a memory that stores therein a program, by using a central processing unit (CPU) that performs a predetermined arithmetic control process based on the program, and by using various kinds of logic circuits, or the like. The vehicle ECU 51 performs a process to control the vehicle 10, such as to perform automatic control on a brake, an accelerator, or steering or to output a warning, based on the analysis data obtained from the imaging device 11 (the image analyzing unit).

FIG. 3 is a diagram illustrating an example of a hardware configuration of the imaging device 11 according to the first embodiment. The imaging device 11 according to the first embodiment includes a stereo camera 12 and an image analyzing unit 13.

The stereo camera 12 includes a first camera unit 21a serving as a left eye and a second camera unit 21b serving as a right eye, where the first camera unit 21a and the second camera unit 21b are assembled parallel to each other. Each of the camera units 21a and 21b includes a lens 22, an image sensor 23, and a sensor controller 24. The image sensor 23 is, for example, a charge coupled device (CCD), a complementary metal-oxide semiconductor (CMOS), or the like. The sensor controller 24 is a device including a circuit that controls exposure of the image sensor 23, controls readout of an image, performs communication with an external circuit, or controls transmission of image data, for example.

The image analyzing unit 13 includes a CPU 31, a field-programmable gate array (FPGA) 32, a read only memory (ROM) 33, a random access memory (RAM) 34, a serial interface (IF) 35, a data IF 36, a data bus line 41, and a serial bus line 42.

The stereo camera 12 is connected to the image analyzing unit 13 via the data bus line 41 and the serial bus line 42. The CPU 31 performs a process to execute operations of the entire image analyzing unit 13, image processing, image recognition processing, or the like in accordance with a program stored in the ROM 33. The luminance data acquired by the image sensor 23 of each of the camera units 21a and 21b is written to the RAM 34 of the image analyzing unit 13 via the data bus line 41. Control data for changing a sensor exposure value, control data for changing an image readout parameter, various kinds of setting data, or the like output from the CPU 31 or the FPGA 32 is transmitted and received to and from the sensor controllers 24 via the serial bus line 42.

The FPGA 32 performs a process that needs to be executed in real time on data stored in the RAM 34. The process that needs to be executed in real time is, for example, a process of generating a disparity image (disparity image data) from a luminance image (luminance image data) by performing gamma correction, distortion correction (parallelization of right and left images), a disparity calculation by block matching, or the like. The disparity image data generated as described above is written to the RAM 34 again.

The CPU 31 controls each of the sensor controllers 24 of the stereo camera 12 and controls the entire image analyzing unit 13. In the ROM 33, a program that causes the CPU 31 or the FPGA 32 to perform various kinds of processing is stored. The CPU 31 acquires, as a parameter, controller area network (CAN) information on the vehicle 10 (a vehicle speed, acceleration, a rudder angle, a yaw rate, or the like) via the data IF 36, for example. The CPU 31 performs various kinds of processing, such as estimation of a road surface shape, recognition of an object, or measurement of a distance, by using the luminance image data and the disparity image data stored in the RAM 34 in accordance with the program stored in the ROM 33.

The analysis data generated by the image analyzing unit 13 is supplied to an external system, such as an automatic brake system, an automatic speed control system, an automatic steering system, or an alarm system, via the serial IF 35, for example.

FIG. 4 is a diagram illustrating an example of a functional configuration of the apparatus control system 1 according to the first embodiment. The apparatus control system 1 according to the first embodiment includes an imaging unit 101, a disparity calculating unit 102, a road surface estimating unit 103, a clustering unit 104, a rejecting unit 105, a tracking unit 106, and a control unit 107. FIG. 4 illustrates an exemplary flow that starts from imaging of one frame by the imaging device 11, continues to estimation of a road surface and an image analysis process including object recognition or the like, and ends with start of vehicle control.

The imaging unit 101 is a functional unit that captures an image of an area ahead of the vehicle 10 and acquires two pieces of luminance image data. The imaging unit 101 is constructed by the imaging device 11 or the like. One of the two pieces of the luminance image data acquired by the imaging unit 101 (for example, the luminance image data of the left view 15 acquired by the first camera unit 21*a*) is used as a reference image, and the other (for example, the luminance image data of the right view 16 acquired by the second camera unit 21*b*) is used as a comparison image.

The disparity calculating unit 102 is a functional unit that calculates a disparity for each of pixels by applying block matching or the like to a local area in an imaging range of the stereo camera 12 by using the luminance image data of the reference image and the luminance image data of the comparison image, and generates disparity image data indicating a disparity image. The disparity calculating unit 102 is constructed by the FPGA 32, the CPU 31, or the like.

The road surface estimating unit 103 is a functional unit that estimates a shape of a road surface on which the vehicle 10 is running, based on the disparity image data. The road surface estimating unit 103 estimates a road surface shape based on a V-disparity Map (a V map or frequency information) that is generated based on the disparity image data.

The road surface estimating unit 103 performs a correction process to cancel out an influence of rolling of the stereo camera 12 when estimating the road surface shape or referring to information indicating the estimated road surface shape. The correction process and the like will be described in detail later. The road surface estimating unit 103 is constructed by the CPU 31, the FPGA 32, or the like.

The clustering unit 104 is a functional unit that performs a clustering process on a disparity group located above the estimated road surface. The clustering process is a process of recognizing a group of pixels located at similar distances (with similar disparity values) on the disparity image as a single object. The method for the clustering process is not specifically limited. For example, it may be possible to apply a method using a U-disparity map (a U-map) in which frequencies of disparities on the disparity image are counted. In this method, an area in which disparities with frequencies higher than a predetermined value are densely accumulated on the U map is detected as a new object, a type of the object (a person, a vehicle, a guard rail, or the like) is estimated based on the coordinates, the size, or the like of the detected area on a luminance image, and individual information indicating the type is generated. The clustering unit 104 is constructed by the CPU 31, the FPGA 32, or the like.

The rejecting unit 105 is a functional unit that performs a process of rejecting an object that is not a recognition target (a target for crash avoidance or the like) among detected objects, by using frame information (the luminance image data, the disparity image data, or the like), the U map, the individual information on the new object, or the like. The rejecting unit 105 is constructed by the CPU 31, the FPGA 32, or the like.

The tracking unit 106 is a functional unit that, when a detected object (an object that is not rejected) successively appears in a plurality of frames, determines whether the object is a tracking target, and generates individual information indicating the tracking target when the object is the tracking target. The tracking unit 106 is constructed by the CPU 31, the FPGA 32, or the like.

The control unit 107 is a functional unit that performs control (a crash avoidance behavior, output of a warning, or the like) on the vehicle 10, based on information on an object as a tracking target, or the like. The control unit 107 is constructed by the vehicle ECU 51 or the like.

FIG. 5 is a diagram illustrating an example of a functional configuration of the road surface estimating unit 103 according to the first embodiment. The road surface estimating unit 103 according to the first embodiment includes a disparity information input unit 151 (an acquiring unit), a V map generating unit 152 (a first generating unit), a segment setting unit 153, a sample point setting unit 154, an outlier point eliminating unit 155, a shape estimating unit 156 (an estimating unit), a height table generating unit 157 (a second generating unit), and a correcting unit 161.

Disparity Information Input Process

The disparity information input unit 151 is a functional unit that inputs disparity image data calculated by the disparity calculating unit 102. The disparity information input unit 151 is constructed by the CPU 31, the FPGA 32, or the like.

FIG. 6 is a diagram for explaining a relationship between a disparity d and a distance D from the stereo camera 12 to an object 171. FIG. 7 is a diagram for explaining a method for converting a size S of the object 171 to the number p of pixels.

As illustrated in FIG. 6, a local portion of the object 171 is captured by two lenses of the first camera unit 21*a* and the second camera unit 21b, and, on an imaging surface 175, an amount of deviation between positions corresponding to the same local portion of the object 171 captured by the camera units 21a and 21b is obtained as a disparity d. The disparity d is calculated by Expression (1) below by using the distance D from the stereo camera 12 to the object 171, a baseline length b between focal positions of the camera units 21a and 21b, and a focal length f.

$$b:d=D:f$$

$$d=b \cdot f/D \quad (1)$$

As illustrated in FIG. 7, the size S [mm] of the object 171 at the distance D [mm] is calculated by Expression (2) below by using the focal length f [mm], the number p of pixels [pix], and a sensor interval c [mm/pix] between the image sensors 23.

$$s:d=c/p:f$$

$$p=s \cdot f/c/D \quad (2)$$

By Expression (2), for example, it becomes possible to convert a lane width at the distance D to the number of pixels.

V Map Generation Process

The V map generating unit 152 is a functional unit that generates a V map based on the disparity image data. The V map generating unit 152 is constructed by the CPU 31, the FPGA 32, or the like. FIG. 8 is a diagram illustrating an example of a disparity image 201. FIG. 9 is a diagram illustrating an example of a V map 221 corresponding to the disparity image 201 illustrated in FIG. 8.

The V map 221 is information that is generated by voting the disparity d, which is a pixel value of each of pixels of the disparity image 201, at a position corresponding to the coordinate of the pixel, and that indicates a frequency of the disparity d for each of the coordinates of the disparity image 201. The V map 221 in this example is a two-dimensional histogram, in which the vertical axis represents the y-coordinate of the disparity image 201 and the horizontal axis represents the disparity d and which is generated by voting the disparity d of each of the pixels of the disparity image 201 at the position (voting position) corresponding to the y-coordinate of the pixel.

The disparity image 201 illustrated in FIG. 8 indicates that an object 212 that is another vehicle is present on a road surface 211. If the disparities d of an area on the road surface 211 in the disparity image 201 are voted on the V map 221, as illustrated in FIG. 9, a distribution area 223 of the disparities d corresponding to the road surface 211 and a distribution area 224 of the disparities d corresponding to the object 212 appear. The distribution area 223 corresponding to the road surface 211 has a shape that continuously slopes down to the right from the left end to the right end. This is because the disparity d increases as a distance to the vehicle 10 becomes closer, and the disparity d in a lower part of the disparity image 201 is greater than the disparity d in an upper part of the disparity image 201. The distribution area 223 may not have the shape that slopes down to the right, depending on the setting of the y-axis. A height H2 of the distribution area 224 corresponding to the object 212 in the y-axis direction corresponds to a height H1 of the object 212 from the road surface 211 in the disparity image 201.

The area to be a voting target in the disparity image 201 does not necessarily have to be the entire disparity image 201. FIG. 10 is a diagram illustrating examples of voting areas 231 to 233 to be voting targets in the disparity image 201. The voting areas 231 to 233 in the example illustrated in FIG. 10 are set so as to include an area in which the road surface 211 is present. By setting the voting areas 231 to 233 as described above, only an area in which the object 212 to be a target for crash avoidance or the like can be handled as a target for image processing; therefore, it is possible to reduce processing load or the like.

Segment Setting Process

The segment setting unit 153 is a functional unit that sets at least one segment (a partition) with reference to the d-coordinate on the V map 221 as illustrated in FIG. 9. A sample point setting process, an outlier point elimination process, and a shape estimation process to be described later may be performed for each of segments 227. The method for setting the segments 227 is not specifically limited. However, by setting the smaller segments 227, it becomes possible to accurately recognize the road surface 211 or the object 212 having a complex shape. For example, it becomes possible to accurately estimate a shape of the road surface 211 having a changing gradient, or the like. The order of execution of the sample point setting process, the outlier point elimination process, and the shape estimation process, which will be described later, after the setting of the segments is not specifically limited. For example, it may be possible to perform the sample point setting process, the outlier point elimination process, and the shape estimation process on the first segment, and thereafter perform these processes on the second segment. Alternatively, it may be possible to perform the sample point setting process on all of the segments, and thereafter perform the outlier point elimination process on all of the segments (and the shape estimation process in the same manner). The segment setting unit 153 is constructed by the CPU 31, the FPGA 32, or the like.

The segment setting unit 153 is not a functional unit that is always needed for the road surface estimation process performed by the road surface estimating unit 103. It may be possible to estimate the shape of the road surface 211 without setting segments in the V map 221.

Sample Point Setting Process

The sample point setting unit 154 is a functional unit that sets at least one sample point from at least one disparity d which is voted on the V map 221. The method for setting (selecting) a sample point is not specifically limited. For example, it may be possible to apply a method for selecting a point with the highest frequency (a highest frequency point) from among a plurality of disparities d located in the vertical direction with respect to the d-coordinate, or a method for limiting an area that may include sample points corresponding to the road surface 211 based on a predetermined criterion. Furthermore, it may be possible to use, as a sample point, the coordinate at which the disparity d is not voted (for example, when the disparity d is not voted at the coordinate of interest, but the disparity d is voted on the periphery with a high frequency). The sample point setting unit 154 is constructed by the CPU 31, the FPGA 32, or the like.

Outlier Point Elimination Process

The outlier point eliminating unit 155 is a functional unit that eliminates an inappropriate sample point from among the set sample points. The method for determining an inappropriate sample point is not specifically limited. For example, it may be possible to apply a method for eliminating a sample point separated by a predetermined distance from an approximate straight line that is set by a least squares method or the like using a plurality of sample points which are voted on the V map 221. The outlier point eliminating unit 155 is constructed by the CPU 31, the FPGA 32, or the like.

The outlier point eliminating unit 155 is not a functional unit that is always needed for the road surface estimation process performed by the road surface estimating unit 103. It may be possible to estimate the shape of the road surface 211 without detecting an outlier point.

Shape Estimation Process

The shape estimating unit 156 is a functional unit that estimates a road surface shape of the road surface 211 by using remaining sample points (sample points that are set by the sample point setting unit 154, and that are not eliminated by the outlier point eliminating unit 155 when the outlier point elimination process is performed). The shape estimating unit 156 estimates the road surface shape by using a plurality of sample points which are voted on the V map 221, and sets a road surface estimation line 225 on the V map 221. When the segment setting unit 153 sets the segments 227 in the V map 221, the road surface shape is estimated for each of the segments 227 by using the sample points remaining in the segment 227 of interest, and the road surface estimation line 225 is set by connecting the estimated road surface shapes. The method for estimating the road surface shape is not specifically limited. For example, it may be possible to apply a method for performing linear approximation on a group of sample points by using a statistical method, such as a least squares method. Furthermore, the method is not limited to linear approximation, and it may be possible to estimate a curved shape by polynomial approximation or the like. The shape estimating unit 156 is constructed by the CPU 31, the FPGA 32, or the like.

It is preferable that the shape estimating unit 156 determines whether the estimation of the road surface shape is successful or not. For example, a reliability of the estimated road surface shape is calculated based on a predetermined criterion, and a road surface shape for which the reliability is below a certain criterion is processed as a failure (re-estimation or the like is performed). For example, if linear approximation using a least squares method is applied, a correlation coefficient may be used as the reliability. When it is determined that the estimation has failed, it may be possible to interpolate a predetermined road surface 211 as an alternative. For example, it may be possible to apply a method using a default road surface that is calculated in advance based on the assumption that a road is flat, or using a past-record road surface that is calculated from past frames. Furthermore, when the segments 227 are set, it may be possible to apply a method for extending a road surface shape that is already estimated in the segment 227 just before the segment 227 of interest.

When the segments 227 are set, it is preferable that the shape estimating unit 156 performs a process of smoothing each of the estimated road surface estimation lines 225 (smoothing) for each of the segments 227. The method for the smoothing is not specifically limited. For example, when the coordinate of an end point of the road surface estimation line 225 of a certain segment 227 does not match the coordinate of a start point of the road surface estimation line 225 of an adjacent segment 227 on the right side of the certain segment 227, it may be possible to modify the road surface estimation lines 225 such that both of the coordinates pass a single coordinate. It is preferable to use the smoothed road surface estimation line 225 as a line that indicates a definitive road surface shape.

Height Table Generation Process

The height table generating unit 157 is a functional unit that generates a height table (height information) indicating a correspondence relationship between the disparity d and the height of the road surface 211 or the object 212 based on the estimated road surface shape (the road surface estimation line 225). The height table generating unit 157 is constructed by the CPU 31, the FPGA 32, or the like.

FIG. 11 is a diagram illustrating an example of the V map 221 and a height table 241. The height table 241 stores therein heights H0, H1, . . . , Hn corresponding to disparities d0, d1, . . . , dn, respectively. For example, if a range of the d-coordinate of the V map 221 is 0 to 960, the height table 241 stores therein 961 values of H0 to H960. The heights H0. H1, . . . , Hn indicate distances from the start point of the y-axis of the V map 221 to the road surface estimation line 225. The values of the heights H0, H1, . . . , Hn correspond to actual heights of the road surface 211 or actual heights of the object 212. By referring to the height table 241 by using an arbitrary disparity d as an input value, it is possible to acquire the height H of the road surface 211 or the object 212 corresponding to the disparity d. The configuration of the height table 241 is not limited to the above-described example.

When the road surface estimation line 225 is represented by a linear function with a slope K and an intercept B, the height H corresponding to a threshold d is obtained by Expression (3) below.

$$H = K*d + B \quad (3)$$

When the V map 221 is divided into a plurality of the segments 227, a relationship between the disparity d and the height H is established for each of the segments 227. Therefore, it is possible to calculate the height H by using the slope K and the intercept B of the road surface estimation line 225 in the segment 227 that includes the disparity d to be referred to.

For example, as illustrated in FIG. 8, when the object 212 is present on the road surface 211, a plurality of disparities d are detected on a single line in the disparity image 201. That is, on a single line that passes a portion in which the object 212 is present, a disparity dr of the road surface 211 and a disparity do of the object 212 are detected. In this case, it is possible to obtain a height Hr of the road surface 211 by using the disparity dr as an input value in the height table 241, and obtain a height Ho of the object 212 by using the disparity do as an input value in the height table 241. Furthermore, a height H of the object 212 from the road surface 211 with respect to the y-coordinate is obtained by Ho−Hr.

Correction Process

The correcting unit 161 is a functional unit that corrects information used to generate information indicating the shape of the road surface 211 so as to cancel out an influence of rolling of the imaging device 11 (the stereo camera 12). The information indicating the shape of the road surface 211 is information used by the clustering unit 104, the rejecting unit 105, the tracking unit 106, the control unit 107, or the like in the stage subsequent to the road surface estimating unit 103. The information used to generate the information indicating the shape of the road surface 211 is the V map 221, the height table 241, information for generating the V map 221 and the height table 241, or the like. The correcting unit 161 according to the first embodiment corrects the height table 241 so as to cancel out an influence of rolling. The correcting unit 161 is constructed by the CPU 31, the FPGA 32, or the like.

FIG. 12 is a diagram for explaining the influence of rolling of the stereo camera 12 on the road surface estimation process. FIG. 13 is a diagram illustrating an example of the V map 221 corresponding to a situation illustrated in FIG. 12. For example, when rolling of the stereo camera 12 occurs in a clockwise direction, as illustrated in FIG. 12, the object 212 that is another vehicle located ahead of a subject vehicle is viewed as if the object is inclined upward to the left. In this case, a disparity d on a line of interest 271 in the disparity image 201 differs between a disparity group A and a disparity group B. In the V map 221 generated in the situation as described above, as illustrated in FIG. 13, the disparities d corresponding to the road surface 211 are distributed in the d-axis direction. In the road surface estimation process, it is usually assumed that the road surface 211 is located in a position below the object 212, and the road surface shape is estimated by using the disparities d corresponding to a relatively lower position. Therefore, in the example illustrated in FIG. 13, the road surface shape is estimated by using a group of disparities d corresponding to a point B, and a group of disparities d corresponding to a point A is subjected to a clustering process and may be recognized as an object.

To solve the problem caused by the rolling as described above, the correcting unit 161 according to the first embodiment corrects the height table 241 so as to cancel out the influence of the rolling. FIG. 14 is a diagram illustrating an example of a functional configuration of the correcting unit 161 according to the first embodiment. The correcting unit 161 includes a rolling information acquiring unit 181, a correction amount calculating unit 182, and a height value correcting unit 183.

The rolling information acquiring unit 181 is a functional unit that acquires rolling information including a roll angle of the stereo camera 12. The method for acquiring the rolling information is not specifically limited. For example, it may be possible to apply a method using information that is measured by calibration when the stereo camera 12 is attached to the vehicle 10, or a method for calculating a roll angle from a slope of an approximate line that is generated by a least squares method using a group of neighboring disparities d.

The correction amount calculating unit 182 is a functional unit that calculates a rolling correction amount based on the rolling information. The rolling correction amount according to the first embodiment is a value that is calculated so as to cancel out a deviation that occurs between the estimated road surface shape and an actual road surface because of the rolling of the stereo camera 12. The rolling correction amount is added to or subtracted from the values of the heights H (H0, H1, . . . , Hn) stored in the height table 241, in order to cancel out the influence of the rolling. The rolling correction amount according to the first embodiment includes a first correction amount and a second correction amount.

FIG. 15 is a diagram illustrating an example of the disparity image 201 when the estimated road surface is corrected by using the rolling correction amount. In FIG. 15, a disparity image 201A before correction is illustrated on the left side, and a disparity image 201B after correction is illustrated on the right side.

In the disparity image 201A before correction, an actual road surface 251 and an uncorrected estimated road surface 252 are illustrated. The actual road surface 251 indicates an area corresponding to the road surface 211 that is captured by the rolling stereo camera 12. In this example, a case is illustrated in which the flat road surface 211 is captured by the stereo camera 12 that is rolling in a counterclockwise direction. The un-corrected estimated road surface 252 indicates a road surface that is estimated through the above-described shape estimation process based on the disparities d of the actual road surface 251.

In the disparity image 201B after correction, the actual road surface 251, the uncorrected estimated road surface 252, a first corrected estimated road surface 261, and a second corrected estimated road surface 262 are illustrated. The first corrected estimated road surface 261 indicates an estimated road surface obtained by correcting the height table 241 by using the first correction amount. The second corrected estimated road surface 262 indicates an estimated road surface obtained by correcting the height table 241 by using the first correction amount and the second correction amount.

The un-corrected estimated road surface 252 has a shape that horizontally extends from one end of the actual road surface 251 that is located in a lower position between the both ends (a left end in the example illustrated in FIG. 15). This is because, as described above, the road surface shape is estimated by using the disparities d located in a lower position in the V map 221 (see FIG. 13 or the like). The un-corrected estimated road surface 252 that is inappropriately estimated needs to be corrected so as to eventually overlap the actual road surface 251, that is, like the second corrected estimated road surface 262.

In the first embodiment, the un-corrected estimated road surface 252 is first corrected by using the first correction amount to obtain the first corrected estimated road surface 261. The angle of the first corrected estimated road surface 261 and the angle of the actual road surface 251 match each other (substantially match each other). The first correction amount is a value to be added to or subtracted from each of the heights H0, H1, . . . , Hn in the height table 241 in order to rotate the un-corrected estimated road surface 252 so as to match the angle of the actual road surface 251. The method for calculating the first correction amount is not specifically limited. For example, the first correction amount is calculated by Expression (4) below, where the first correction amount is εx, the roll angle of the stereo camera 12 is θ, the x-coordinate of interest in the disparity image 201 is x, and a vanishing point of the road surface 211 is foe_x.

$$\varepsilon x = \tan \theta * (x - foe\_x) \quad (4)$$

foe_x indicates a reference point for rotation of the stereo camera 12, and if the stereo camera 12 is not yawing to the left and right, the x-coordinate of the center of the disparity image 201 and the x-coordinate of the vanishing point match each other. As indicated in Expression (4), by subtracting foe_x, the reference point for rotation is moved from the origin (x=0) to the position of foe_x. foe_x is one example of the reference point for rotation, and it may be possible to alternatively use a more preferred point. By adding or subtracting the first correction amount Ex calculated as described above to or from each of the heights H0, H1, . . . , Hn in the height table 241, it is possible to correct the un-corrected estimated road surface 252 to obtain the first corrected estimated road surface 261 whose angle matches the angle of the actual road surface 251. In this case, the un-corrected estimated road surface 252 is rotated about an intersection point with a reference axis 255.

The first corrected estimated road surface 261 is subsequently corrected by using the second correction amount to obtain the second corrected estimated road surface 262. The second corrected estimated road surface 262 and the actual road surface 251 have angles that match each other, and the positions thereof on the y-axis match each other (substantially match each other). The second correction amount is a value to be added to or subtracted from each of the heights H0, H1, . . . , Hn in the height table 241 in order to translate the first corrected estimated road surface 261 by a distance Doff in the y-axis direction. The method for calculating the second correction amount is not specifically limited. For example, the second correction amount is calculated by Expression (5) below, where the second correction amount is δ, the roll angle is θ, and a width of the road surface 211 is road_width.

$$\delta = abs(\tan \theta * (road\_width/2)) \quad (5)$$

abs represents an absolute value. road_width may be a value, such as 3500 [mm], indicating a single lane width. It may be possible to set the value of road_width in accordance with the widths of the voting areas 231 to 233 illustrated in FIG. 10. The shape estimation process on the road surface 211 can be performed exclusively on the disparities d in the voting areas 231 to 233; therefore, the lateral widths of the disparities d of the road surface 211 inclined due to the rolling match the widths of the voting areas 231 to 233. In Expression (5), foe_x is set at the center; therefore, the second correction amount δ corresponds to a value that is obtained by converting road_width to a half value and then multiplying the half value by a tan value of the roll angle θ. The second correction amount δ is determined from the width, and therefore is independent of the position of the x-coordinate.

An example will be described below in which a reference value, which is extracted when referring to each of the heights H0, H1, . . . , Hn in the height table 241 generated from the un-corrected estimated road surface 252, i.e., the height table 241 before correction, is corrected by using the first correction amount and the second correction amount. When a height of the corrected road surface 211 corresponding to the disparity d is denoted by Hd', a height of the un-corrected road surface 211 corresponding to the disparity d (a reference value extracted from the height table 241 before correction) is denoted by Hd, the first correction amount is denoted by εx, and the second correction amount is denoted by δ, a relationship represented by Expression (6) below is established.

$$Hd' = Hd - \varepsilon x - \delta \quad (6)$$

In the first embodiment, the heights H0, H1, . . . , Hn stored in the height table 241 are calculated by the V map 221 in which the origin is set at the upper left; therefore, the first correction amount εx and the second correction amount δ are used as subtraction values. However, for example, when a V map in which the origin is set at the lower left is used, the first correction amount εx and the second correction amount δ are used as addition values. To calculate the height of the road surface 211, a value of the road surface estimation line 225 on the y-axis is subtracted from Hd'. Meanwhile, the second correction amount δ is an actual distance, and therefore, it is necessary to adjust a unit in accordance with other parameters. This is done by converting a unit system of road_width from an actual distance to a pixel based on Expression (1) and Expression (2).

Through the operation as described above, a reference value extracted from the height table 241 generated from the un-corrected estimated road surface 252 can be handled in the same manner as a value in the height table 241 generated from the second corrected estimated road surface 262. In the above-described example, a method has been described in which the correction amount is added to or subtracted from the reference value when the height table 241 is referred to; however, it may be possible to correct a value in the height table 241 in advance by Expression (6). In this case, the height table 241 may be generated as a two-dimensional table in which the height H of the corrected road surface 211 can be referred to based on a combination of d and x.

In the above-described example, the first correction amount εx and the second correction amount δ are calculated for each of the x-coordinates; however, if a detailed calculation is not needed, it may be possible to perform a calculation with a relatively rough predetermined resolution. For example, if the disparity image 201 with a lateral width of 1000 is processed with a resolution of 10, it may be possible to calculate 100 kinds of correction amounts for each of the correction amounts εx and δ, and apply correction amounts εx and δ that are common to all of the x coordinates included in each of the segments. As the x-coordinate for calculating the first correction amount εx in this case, it is possible to use a predetermined x-coordinate with the same resolution. For example, if the resolution is set to 10, the first correction amount εx in the first segment can be calculated with any of the values of x=1 to 10. Furthermore, the x-coordinates may be calculated for a predetermined range. For example, it is not necessary to calculate the correction amounts εx and δ for a range of the x-coordinates that are not included in the voting areas 231 to 233. In this manner, the x-coordinates for calculating the correction amounts εx and δ can be arbitrarily set.

Furthermore, in the above-described example, the method has been described in which the correction is performed by setting the x-coordinate of the vanishing point at the center; however, if the lateral width of the road surface 211 is already known, it may be possible to perform rotation correction by the first correction amount εx by using an end point of the un-corrected estimated road surface 252 as a reference point. For example, in the case as illustrated in FIG. 15, if rotation correction by the first correction amount εx is performed by using the left end of the un-corrected estimated road surface 252 as a reference point, it is possible to eliminate translation correction using the second correction amount S.

FIG. 16 is a flowchart illustrating an example of the flow of a process performed by the road surface estimating unit 103 according to the first embodiment. First, the disparity information input unit 151 reads the disparity image 201 (the disparity image data) generated from the disparity information (Step S101). Subsequently, the V map generating unit 152 generates the V map 221 from the disparity image 201 (Step S102). At this time, the disparities d in the disparity image 201 are voted on the V map 221. Subsequently, the sample point setting unit 154 sets sample points from a disparity group which are voted on the V map 221 (Step S103). The sample points may be set for each of the segments 227 when the segments 227 are set in the V map 221. Subsequently, the shape of the road surface 211 is estimated based on a distribution state of a sample point group including a plurality of sample points (Step S104). At this time, it may be possible to perform a process of detecting an outlier point from the sample point group based on a predetermined criterion and eliminating the outlier point before estimating the road surface shape. Subsequently, the correcting unit 161 calculates the rolling correction amount to cancel out an influence of rolling (Step S105). Subsequently, the height table generating unit 157 determines a value of the height in the height table 241 by adding or subtracting the rolling correction amount to or from a value on the estimated road surface shape (Step S106). At this time, it may be possible to add or subtract the rolling correction amount when the value of the height in the height table 241 is referred to, or may store a value obtained by adding or subtracting the rolling correction amount in advance in the height table 241.

According to the first embodiment as described above, the heights H0, H1, . . . , Hn in the height table 241 are corrected in accordance with the roll angle θ. That is, after the shape of the road surface 211 is estimated based on the V map 221, a correction process for cancelling out the influence of rolling is performed. Therefore, even when rolling occurs on the road surface 211 with a changing gradient, it is possible to handle the road surface 211 as a flat surface, so that it is possible to estimate the shape of the road surface 211 with high accuracy.

A second embodiment will be described below with reference to the drawings. Components with the same or equivalent functions and effects as those of the first embodiment are denoted by the same signs, and the same explanation may be omitted.

Second Embodiment

FIG. 17 is a diagram illustrating an example of a functional configuration of a road surface estimating unit 303 according to the second embodiment. The road surface estimating unit 303 according to the second embodiment is a functional unit that corresponds to the road surface estimating unit 103 according to the first embodiment, and estimates the shape of the road surface 211 by using the V map 221 or the like. The road surface estimating unit 303 according to the second embodiment includes, similarly to the road surface estimating unit 103 according to the first embodiment, a V map generating unit 352 that generates the V map; and the V map generating unit 352 includes a correcting unit 361 that corrects information used to generate information indicating the shape of the road surface 211 so as to cancel out an influence of rolling of the stereo camera 12.

The correcting unit 361 according to the second embodiment corrects the V map 221 so as to cancel out the influence of rolling. The method for correcting the V map 221 is not specifically limited. For example, data which is voted from the disparity image 201 to the V map 221 is corrected in accordance with the rolling information. As described in the first embodiment, when the stereo camera 12 is rolling, the disparities d on a certain line in the disparity image 201 include a disparity d that is originally expected to be extracted on a different line. Therefore, if each of the disparities d in the disparity image 201 is voted as it is on a line in the V map 221, a distribution area of the voted disparities d is spread in the lateral direction (see FIG. 13 or the like). The correcting unit 361 according to the second embodiment is provided to solve the problem that occurs in generating the V map 221 as described above.

When the roll angle θ is already known, and if the coordinates at which the disparities d are extracted is subjected to rotation conversion in accordance with the roll angle θ, it is possible to obtain the y-coordinate at which the disparity d is originally expected to be voted. FIG. 18 is a diagram illustrating an example of a voting state on the V map 221 before correction. FIG. 19 is a diagram illustrating an example of a voting state on the V map 221 after correction. In the disparity image 201 illustrated in FIG. 18, a disparity group 373 corresponding to the road surface 211 captured by the stereo camera 12 that is rolling in a counterclockwise direction is illustrated. In this example, a disparity 1 and a disparity 2 included in the disparity group 373 are focused on. If the disparity group 373 is rotated due to the rolling, as illustrated in the right side in FIG. 18, votes for the disparity 1 and the disparity 2 are voted as disparities on different voting lines 381 and 382 in the V map 221.

To solve the problem with the voting as described above, the correcting unit 361 first sets a reference point 375 used to rotate the disparity group 373. The method for setting the reference point 375 is not specifically limited. For example, the center point of the disparity image 201, the vanishing point of the road surface 211, or the like may be used as the reference point 375. The correcting unit 361 subsequently rotates each of the disparities d included in the disparity group 373 by using the reference point 375 as a rotation axis, and determines the corrected voting position of each of the disparities d (the y-coordinate on the V map 221). When the voting position of the corrected disparity d on the V map 221 is denoted by y', the x-coordinate of the the disparity d in the disparity image 201 before correction is denoted by x, the y-coordinate of the disparity d in the disparity image 201 before correction is denoted by y, and the roll angle from a reference line 371 that is a horizontal line including the reference point 375 is denoted by θ, Expression (7) below is established.

$$y'=x \sin \theta + y \cos \theta \qquad (7)$$

In the left side in FIG. 19, a corrected disparity group 388 is illustrated in which the corrected voting positions determined as described above is reflected. All of the disparities d included in the corrected disparity group 388 are located on a line that passes a single y-coordinate (y'). Therefore, as illustrated in the right side in FIG. 19, all of the disparities d, which are voted from the corrected disparity group 388 to the V map 221, are voted on a single voting line 385 in the V map 221.

FIG. 20 is a flowchart illustrating an example of the flow of a process performed by the road surface estimating unit 303 according to the second embodiment. First, the disparity information input unit 151 reads the disparity image 201 (the disparity image data) generated from the disparity information (Step S101). Subsequently, the correcting unit 361 rotates the disparity image 201 in accordance with the roll angle θ (corrects the voting position of each of the disparities d in the disparity image 201 in accordance with the roll angle θ) (Step S201). Subsequently, the V map generating unit 352 generates the V map 221 from the rotated disparity image 201 (Step S202). At this time, each of the disparities d in the disparity image 201 is voted at a converted position on the V map 221. Subsequently, the sample point setting unit 154 sets sample points from a disparity group which are voted on the V map 221 (Step S103). The sample point may be set for each of the segments 227 when the segments 227 are set in the V map 221. Subsequently, the shape of the road surface 211 is estimated based on a distribution state of a sample point group including a plurality of sample points (Step S104). At this time, it may be possible to perform a process of detecting an outlier point from the sample point group based on a predetermined criterion and eliminating the outlier point before estimating the road surface shape. Subsequently, a height table generating unit 357 determines a value of the height in the height table 241 from a value on the estimated road surface shape (Step S203).

According to the second embodiment as described above, the voting position of each of the disparities d in the disparity image 201 is corrected in accordance with the roll angle θ, and the V map 221 is generated based on the corrected disparities d. That is, the shape of the road surface 211 is estimated based on the V map 221 subjected to the correction process for cancelling out the influence of rolling. Therefore, even when rolling occurs on the road surface 211 with a changing gradient, it is possible to handle the road surface 211 as a flat surface, so that it is possible to estimate the shape of the road surface 211 with high accuracy.

In the above-described embodiments, an example has been described in which the disparity d is used as the distance information indicating a distance between the vehicle 10 and an object (the road surface 211 and the object 212); however, the distance information is not limited to the disparity, but may be information acquired by using a millimeter-wave radar, a laser radar, or the like, for example. Therefore, the disparity image 201 described above is an example of the distance image indicating a distance. If the distance information other than the disparity is used, it may be possible to use a distance image corresponding to the distance information.

Furthermore, in the above-described embodiments, the apparatus control system 1 mounted on an automobile as the vehicle 10 has been described; however, the present invention is not limited to this example. For example, the system may be mounted on a vehicle, such as a bike, a bicycle, a wheel chair, or an agricultural cultivator. Moreover, the apparatus is not limited to the vehicle, but may be a mobile object, such as a robot.

Furthermore, in the above-described embodiments, when at least a part of the functional units of the apparatus control system 1 is implemented by execution of a program, the program is provided by being incorporated in a ROM or the like in advance. Moreover, the program may be provided by being recorded in a computer-readable recording medium, such as a compact disc ROM (CD-ROM), a flexible disk (FD), a compact disk recordable (CD-R), or a digital versatile disk (DVD), in a computer-installable or computer-executable file format. Furthermore, the program may be stored in a computer connected to a network, such as the Internet, and may be provided by being downloaded via the network. Furthermore, the program may be provided or distributed via a network, such as the Internet. Furthermore, the program may have a module structure including at least one of the above-described functional units.

REFERENCE SIGNS LIST

1 Apparatus control system
10 Vehicle
11 Imaging device
15 Left view
16 Right view
17 Traveling direction
51 Vehicle ECU (apparatus control unit)
12 Stereo camera (distance information acquiring unit)
13 Image analyzing unit (information processing device)
21a First camera unit
21b Second camera unit
22 Lens
23 Image sensor
24 Sensor controller
31 CPU
32 FPGA
33 ROM
34 RAM
35 Serial IF
36 Data IF
41 Data bus line
42 Serial bus line
101 Imaging unit
102 Disparity calculating unit
103, 303 Road surface estimating unit
104 Clustering unit
105 Rejecting unit
106 Tracking unit
107 Control unit
151 Disparity information input unit
152, 352 V map generating unit
153 Segment setting unit
154 Sample point setting unit
155 Outlier point eliminating unit
156 Shape estimating unit
157, 357 Height table generating unit
161, 361 Correcting unit
171, 212 Object
175 Imaging surface
181 Rolling information acquiring unit
182 Correction amount calculating unit
183 Height value correcting unit
201, 201A, 201B Disparity image
211 Road surface
221 V map (frequency information)
223, 224 Distribution area
225 Road surface estimation line
227 Segment
231 to 233 Voting area
241 Height table
251 Actual road surface
252 Un-corrected estimated road surface
255 Reference axis
271 Line of interest
373 Disparity group
375 Reference point
381, 382, 385 Voting line
θ Roll angle

CITATION LIST

Patent Literature

PTL 1: Japanese Patent Application Laid-open No. 2001-091217

The invention claimed is:

1. An information processing device comprising:
circuitry configured to
acquire distance image data indicating a distance image including distance information;
generate frequency information indicating a frequency of the distance information for each of coordinates in the distance image by voting the distance information at a position corresponding to a coordinate of each of pixels of the distance image based on the distance image data;
estimate a road surface shape based on the frequency information;
generate height information indicating a relationship between the distance information and a height of a road surface based on the estimated road surface shape; and
correct, based on rolling information on rolling of a distance information acquiring device that acquires the distance information, information used to generate information indicating the road surface shape so as to cancel out an influence of the rolling,
wherein the circuitry corrects the height information based on the rolling information, and the circuitry adds or subtracts a rolling correction amount, which is calculated so as to cancel out a deviation that occurs between the estimated road surface shape and an actual road surface caused by the rolling, to or from the height included in the height information.

2. The information processing device according to claim 1, wherein the rolling correction amount includes a first correction amount to rotate the estimated road surface shape such that a slope of the estimated road surface shape matches a slope of an actual road surface, and a second correction amount to translate the estimated road surface shape such that coordinates of the estimated road surface match coordinates of the actual road surface.

3. The information processing device according to claim 1, wherein the circuitry adds or subtracts the rolling correction amount when a predetermined height is extracted and referred to from the height information.

4. The information processing device according to claim 1, wherein the circuitry corrects the frequency information based on the rolling information.

5. The information processing device according to claim 4, wherein the circuitry corrects a voting position of the distance information which is voted from the distance image to the frequency information.

6. The information processing device according to claim 1, wherein
the distance information acquiring device is a stereo camera,
the distance information is a disparity,
the distance image is a disparity image, and
the distance image data is disparity image data indicating the disparity image.

7. An imaging device comprising:
a stereo camera configured to generate the distance image data; and
the information processing device according to claim 1.

8. An apparatus control system comprising:
the information processing device according to claim 1; and
circuitry configured to control a behavior of an apparatus based on information indicating the road surface shape.

9. An information processing method comprising:
acquiring distance image data indicating a distance image including distance information;
generating frequency information indicating a frequency of the distance information for each of coordinates in the distance image by voting the distance information at a position corresponding to a coordinate of each of pixels of the distance image based on the distance image data;
estimating a road surface shape based on the frequency information;
generating height information indicating a relationship between the distance information and a height of a road surface based on the estimated road surface shape; and
correcting, based on rolling information on rolling of a distance information acquiring device that acquires the distance information, information used to generate information indicating the road surface shape so as to cancel out an influence of the rolling,
wherein the method includes correcting the height information based on the rolling information, and
adding or subtracting a rolling correction amount, which is calculated so as to cancel out a deviation that occurs between the estimated road surface shape and an actual road surface caused by the rolling, to or from the height included in the height information.

10. A computer program product comprising a non-transitory computer-readable recording medium having stored therein a program that causes a computer to execute a method comprising:
acquiring distance image data indicating a distance image including distance information;
generating frequency information indicating a frequency of the distance information for each of coordinates in the distance image by voting the distance information at a position corresponding to a coordinate of each of pixels of the distance image based on the distance image data;
estimating a road surface shape based on the frequency information;
generating height information indicating a relationship between the distance information and a height of a road surface based on the estimated road surface shape; and
correcting, based on rolling information on rolling of a distance information acquiring device that acquires the distance information, information used to generate information indicating the road surface shape so as to cancel out an influence of the rolling,
wherein the method includes correcting the height information based on the rolling information, and
adding or subtracting a rolling correction amount, which is calculated so as to cancel out a deviation that occurs between the estimated road surface shape and an actual road surface caused by the rolling, to or from the height included in the height information.

* * * * *